C. WALTE.
ROTARY LAWN RAKE.
APPLICATION FILED NOV. 27, 1908.

939,765.

Patented Nov. 9, 1909.

WITNESSES:
John E. Heller.
Minnie C. Rollwage.

INVENTOR
Charles Walte,
BY
Abraham Knobel,
ATTORNEY

UNITED STATES PATENT OFFICE.

CHARLES WALTE, OF LOUISVILLE, KENTUCKY.

ROTARY LAWN-RAKE.

939,765.  Specification of Letters Patent.  Patented Nov. 9, 1909.

Application filed November 27, 1908. Serial No. 464,580.

*To all whom it may concern:*

Be it known that I, CHARLES WALTE, a citizen of the United States, residing at Louisville, in the county of Jefferson and State of Kentucky, have invented a new and useful Rotary Lawn-Rake, of which the following is a specification.

This invention relates to lawn implements, and the objects of my improvement are, cheapness and ease of manufacture, ease of operation, effectiveness, simplicity of construction and ease of handling, and durability. These objects I attain by means of the mechanism illustrated in the accompanying drawings, in which—

Figure 1:
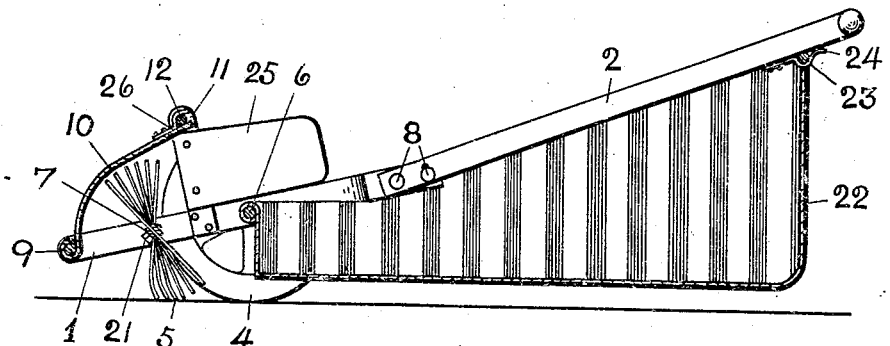
Figure 2:
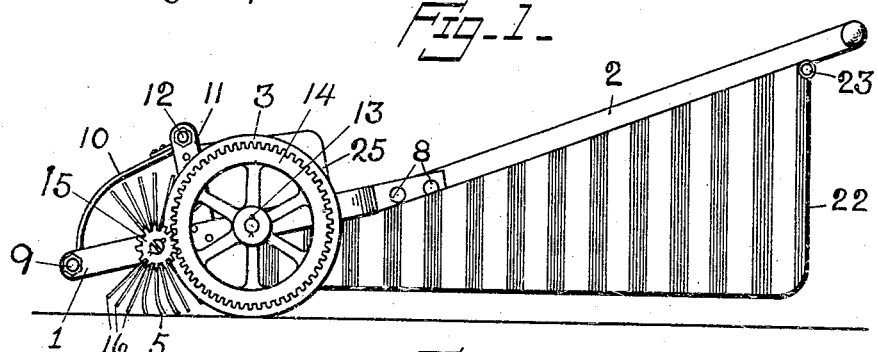
Figure 3:
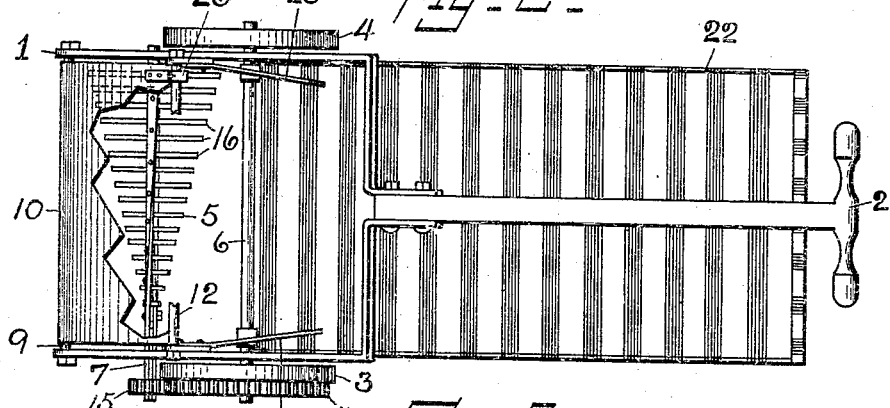
Figure 4:
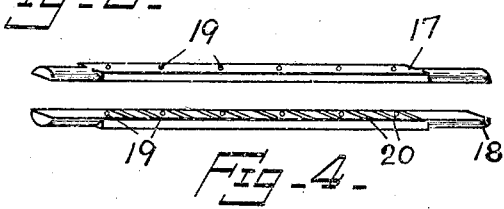

Figure 1 is a vertical section; Fig. 2, a side elevation; Fig. 3, a plan view; and Fig. 4 is a detail view of the rake shaft.

Similar reference numerals refer to similar parts throughout the several views of the drawings.

The body of the machine embodying my invention consists of a frame, 1, a handle, 2, a driving-wheel, 3, a wheel, 4, and a rotary rake, 5. The frame 1 I prefer to construct of two pieces of flat bar iron, bent in the manner shown and provided at their sides with holes adapted to receive a main shaft, 6, and journal bearings for the journals of a rake-shaft, 7. The rear ends of the parts of frame 1 are provided with holes adapted to receive bolts, 8, by means of which the handle 2 may be adjustably clamped in the frame. The front end of the parts of frame 1 are also provided with holes for receiving a bar, 9, upon which is pivotally mounted a sheet metal guard, 10, adapted to cover the rake 5 and confine leaves, grass, and the like in contact with same and direct them over the rake, in order that the teeth may throw them backward toward the handle 2.

The frame 1 is provided with uprights, 11, on either side, in which is mounted a transverse bar, 12, adapted to receive the free end of guard 10 and hold it in position.

The wheels 3 and 4 are placed upon shaft 6 loose and are secured against coming off preferably by a split cotter pin, 13. The shaft 6 is preferably stationary in the frame 1, and wheels 3 and 4 are permitted to turn on the shaft.

Wheel 3 is provided, preferably on the outside, with a gear, 14, integral therewith or rigidly secured thereto.

Rake-shaft 7 is journaled at either end in bearings in frame 1, and one end extends beyond the frame and is provided with a pinion, 15, adapted to mesh with gear 14, all so coöperating that, when the wheel 3 runs upon the ground, the rake-shaft 7 is rotated in the direction opposite that of the wheel. Thus loose objects upon the ground are raked forward when the machine is pushed, and are elevated between the ends of the rake-teeth, and the guard 10, carried around in contact with guard 10, and thrown out above toward handle 2. If the machine is pulled, rake 5 rotates in the opposite direction, so that leaves and other articles are brushed toward handle 2 from underneath.

The rake 5 is made up of diametral spring rake-teeth, 16, arranged in spiral alinement. The teeth 16 are made of flat or round spring wire, each piece being the length of the diameter of the rake. I prefer to make up the rake by taking two flat pieces, 17 and 18, of soft steel, provided with bolt holes, 19, suitably spaced and scoring adjacent faces transversely at suitable intervals as shown at 20. I then place the strips 17 and 18 together, securing them loosely with bolts, 21, (Fig. 1). The teeth 16 are then inserted in the openings left by the scores 20. When the teeth are in place, the nuts of the bolts 21 are screwed up, so that teeth 16 are securely held. The shaft 7, as thus assembled, is held stationary at one end, and the other end is given a quarter turn, with a wrench or other means, so that the shaft is twisted, and the teeth 16 permanently assume the spiral arrangement. I then preferably form the journals on the ends of the shaft by means of a hollow mill. In this way a light, strong, and easily manufactured rake is provided. It will be understood that with the spiral arrangement of teeth 16, only a few of the teeth will engage the surface of the ground at a time, and the teeth, being springy, yield to hard obstructions, readily passing over them. By this means the machine is more easily pushed, than if an entire row of rake-teeth were brought into action simultaneously.

I have shown the rake-shaft as passing through, or mounted in the frame 1.

An apron, 22, is secured at its forward portion to shaft 6, and at its rear portion to a rod, 23, which in turn is secured underneath handle 2, by means of a spring clip, 24. The leaves and grass brushed up by rake 5, when thrown back toward handle 2, fall into apron 22 when rake 5 is rotated in either direction. To direct the leaves more surely into apron 22, I provide guard or baffle plates, 25, which I secure to uprights 11, in the manner shown. These are preferably made of sheet metal, in order that they may be light and durable.

The guard 10 is preferably made of sheet metal of a springy quality, and provided at its forward or free end with clips, 26, which are open in front and adapted to embrace rod 12. In adjusting guard 10 in position, the guard is sprung, so that its front end may be passed under rod 12 and clips 25 passed over the rod. The guard will then spring forward when released, so that its front end maintains a secure hold on rod 12. If any obstruction is caught between the rake and the guard, the guard may be easily released from rod 12, swung forward on rod 9, the obstruction removed, and the guard replaced. Guard 10 is also easily and cheaply made, being preferably merely a piece of tin-plate.

Having thus described my invention, so that its construction and use are obvious to those skilled in the art pertaining thereto, I claim—

In a lawn rake, a frame, a driving-wheel mounted on said frame, a rotary rake, and spur gear operatively connecting said driving-wheel and said rotary rake, said rake comprising a shaft made of two bars of malleable material secured side by side, strips of spring metal secured transversely between the bars and forming diametral rake-teeth, the said bars being twisted so that the rake-teeth are arranged in spiral relation.

CHARLES WALTE.

Witnesses:
ABRAHAM KNOBEL,
WM. J. SAUER.